United States Patent [19]

Stolz

[11] 4,023,239

[45] May 17, 1977

[54] COUPLNG ROD FOR CONNECTING THE ENDS OF A CONVEYOR BELT

[75] Inventor: Hermann Stolz, Muhlheim am Main, Germany

[73] Assignee: Mato Maschinen- und Metallwarenfabrik Curt Matthaei GmbH & Co. KG, Offenbach am Main, Germany

[22] Filed: Feb. 5, 1976

[21] Appl. No.: 655,616

[30] Foreign Application Priority Data

Feb. 21, 1975 Germany .......................... 2507474

[52] U.S. Cl. .................. 24/33 P; 16/168; 74/231 J; 198/846; 198/851; 403/41

[51] Int. Cl.² .......................................... F16G 3/02

[58] Field of Search ............. 403/41, 291, 123, 56; 248/160; 24/31 H, 33 P, 33 C; 16/168, 176; 74/231 J; 198/846, 844, 851

[56] References Cited

UNITED STATES PATENTS

| | | | |
|---|---|---|---|
| 438,356 | 10/1890 | McEnany | 285/228 X |
| 599,543 | 2/1898 | Whitaker | 248/160 |
| 912,308 | 2/1909 | Grimler | 248/160 |
| 2,510,198 | 6/1950 | Tesmer | 248/160 X |
| 2,962,782 | 12/1960 | Beach | 16/168 X |
| 3,096,962 | 7/1963 | Meijs | 248/276 |
| 3,266,059 | 8/1966 | Stelle | 403/123 X |
| 3,584,822 | 6/1971 | Oram | 248/160 |

FOREIGN PATENTS OR APPLICATIONS 926,645 4/1955 Germany .......................... 24/33 C

*Primary Examiner*—Andrew V. Kundrat
*Attorney, Agent, or Firm*—W. G. Fasse; W. W. Roberts

[57] ABSTRACT

A coupling rod for connecting the ends of a conveyor belt comprises a flexible core enclosed within a plurality of sleeves, each of which has curved end faces in contact with mating faces of adjacent sleeves. The sleeves may have both end faces convex or concave, or one end face convex and the other end face concave. The sleeve bores may vary in diameter along their lengths, the smallest diameter being in the middle of the bore for a sleeve having both end faces convex, or at the concave end face of a sleeve having one end face convex and the other end face concave so as to bear evenly on the core when the rod bends under load.

9 Claims, 10 Drawing Figures

COUPLNG ROD FOR CONNECTING THE ENDS OF A CONVEYOR BELT

BACKGROUND OF THE INVENTION

The invention relates to a coupling rod for connecting the ends of conveyor belts and including a flexible core and pushed-on sleeves.

Such coupling rods are known for example from German Patent Specification No. 926,645 and No. 2,240,013. The flexible core of the coupling rod according to German Patent Specification No. 926,645 is loaded by transverse forces which the sleeves transmit to it, and particularly when the coupling rod is bent, end pressures occur. In the case of the coupling rod according to German Patent Specification No. 2,240,013, sleeves pushed onto the core can indeed themselves largely transmit the transverse forces without loading the core, but likewise when the coupling rod is bent, end pressures may occur in fact both between the sleeves and also between sleeves and core.

OBJECTS OF THE INVENTION

The invention intends to solve the problem of providing a coupling rod of the mentioned type, in which the transverse forces applied by the sleeves to the core are extremely low and in which no end pressures arise between the sleeves or core. Furthermore, when the connecting elements revolve around drums, it is desirable that there be no sliding movement between the rings and the sleeves, but only between the sleeves.

SUMMARY OF THE INVENTION

In order to solve this problem, the invention provides for the sleeves with convexly curved end faces which bear on each other. Consequently, a form-locking contact is achieved in the direction of the transverse forces between adjacent sleeves, by which the transverse forces are transmitted from sleeve to sleeve without the core being loaded thereby.

In a further embodiment of the invention, the end faces are concavely or convexly formed or are constructed as part of a spherical surface whereby even when the coupling rod is bent, a perfect transmission of forces is achieved without any loading of the core.

BRIEF FIGURE DESCRIPTION

The invention is described in greater detail hereinafter with reference to embodiments shown in the accompanying drawings, in which.

DETAILED DESCRIPTION OF PREFERRED EXAMPLE EMBODIMENTS

Figure 1:
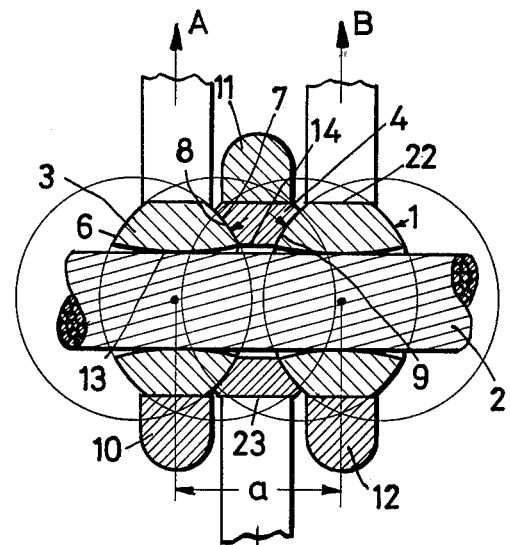
FIG. 1 is a sectional view of a part of a coupling rod according to the invention, in the straight position.

A coupling rod 1 according to the invention, of which portions are shown in FIGS. 1, 2, 7 and 8, comprises a flexible core 2 and pushed-on sleeves 3 and 4 as well as an end piece 5 which is mounted in a known manner on the core 2. The sleeves 3 have convexly curved end faces 6 and 7, while the end faces 8 and 9 of the sleeves 4 are correspondingly concavely curved, so that they fit into one another in a form-locking manner. As is shown in FIG. 1, the end faces 6, 7 and 8, 9 are parts of the surfaces of a sphere, so that the coupling rod 1 can easily be bent without any variation in the distances between the centres of equivalent sleeves 3, 4. In consequence, when the coupling rod 1 is bent, the core 2 is no longer subjected to a traction loading as in the past. Furthermore, by reason of the fact that adjacently disposed sleeves 3 and 4 bear in a spherically form-locking fashion on one another, a perfect transmission of the transverse forces A, B, C emanating from the rings 10, 11 and 12, to the respectively adjacent sleeves is achieved in any position of the coupling rod 1.

Figure 2:
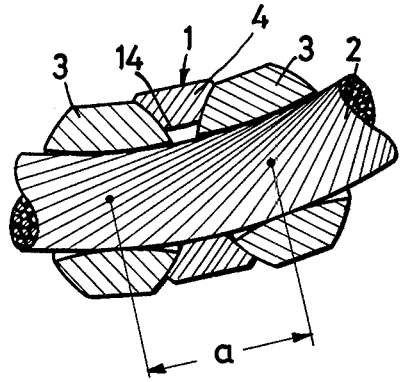
FIG. 2 is a sectional view of the part shown in FIG. 1, in a curved condition.

The occurrence of end or edge pressures between the sleeves and the core is avoided since the bore 13 of each of the sleeves increases in diameter in an outward direction. The diameter of the bore 14 in the sleeve 4 which is concavely curved at both ends, corresponds to the largest diameter of the bore 13. If the coupling rod 1 is bent, as shown in FIG. 2, then the sleeve 4 which is concavely curved at both ends shifts somewhat toward the centre of curvature of the bend. In addition, a relatively large part of the length of the flexible core 2 bears against the inside of the bore 13 in the sleeve 3. The surface of the bores 13 is formed by envelope curves which are arcs of a circle, the radius of which corresponds to the smallest given bending radius R, according to FIG. 8, of the coupling rod 1.

Figure 3:
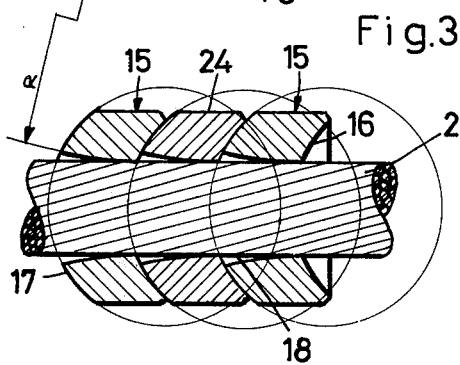
FIG. 3 is a sectional view as in FIG. 1 but of another embodiment.
Figure 4:
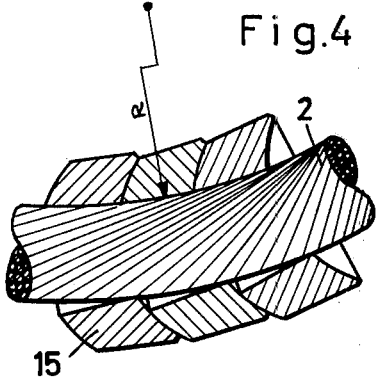
FIG. 4 is a sectional view as in FIG. 2 and relating to the embodiment shown in FIG. 3.

FIGS. 3 and 4 show the sleeves 15 of which one end face 16 concavely while the other end face 17 is convexly curved. Here, too, the end faces 16 and 17 are parts of the surfaces of spheres of the same size or the same radius and in each case they bear on each other in a form-locking manner.

The bore 18 in the sleeves 15, which serves to accommodate the core 2 has one face of smallest diameter at one of its ends and is conically shaped. At the same time the surface of the bore 18 is convex whereby the radius of convexity corresponds to the smallest bending radius R to which the coupling rod may be exposed. The small diameter of the bore 18 lies at its end which is adjacent to the concave end face 16.

Figure 5:
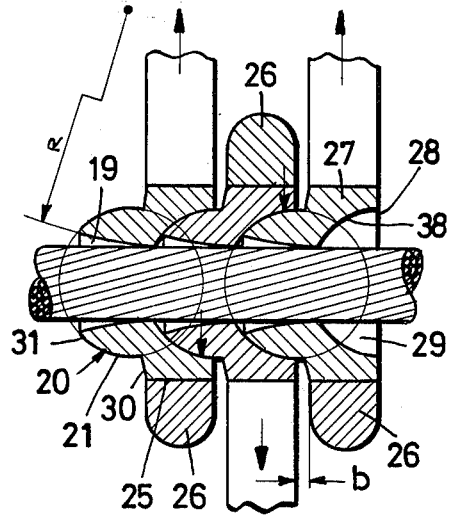
FIG. 5 is a sectional view as in FIG. 1 but of a third embodiment.
Figure 6:
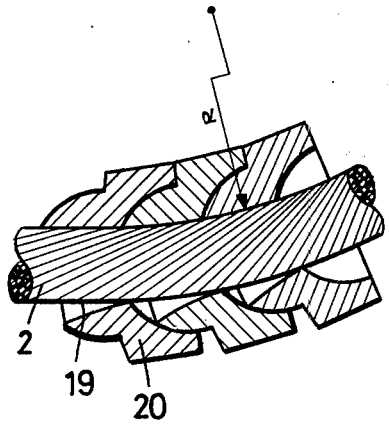
FIG. 6 is a sectional view as in FIG. 2, of the embodiment shown in FIG. 5.
Figure 7:
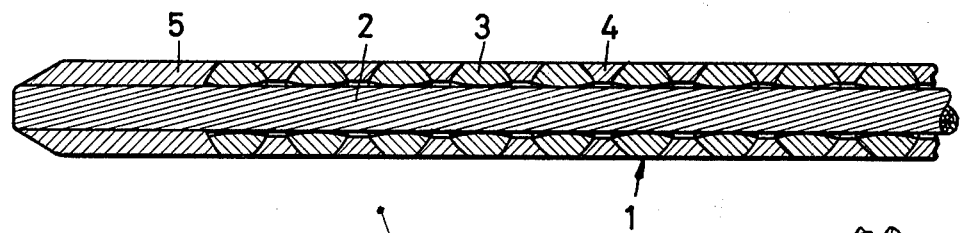
FIG. 7 is a sectional view of an end piece of the coupling rod according to FIG. 1, in the straight condition.
Figure 8:
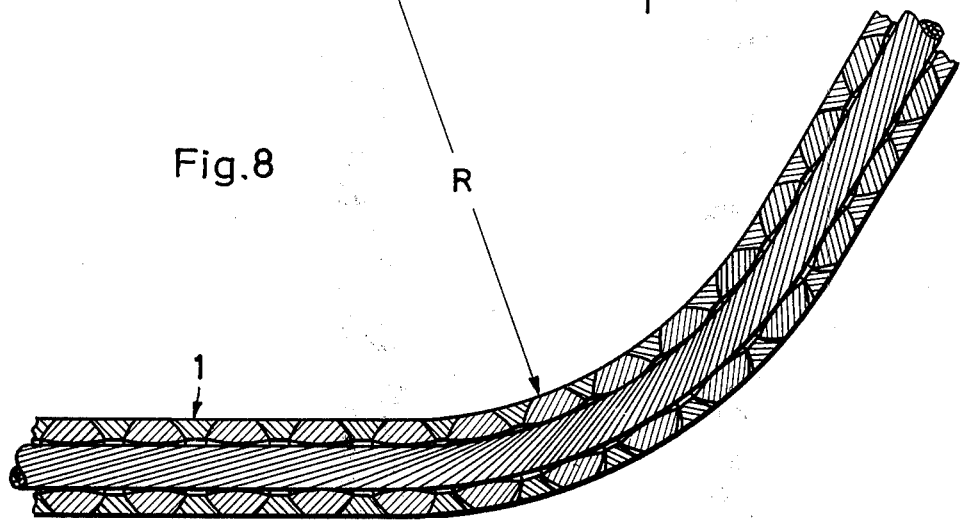
FIG. 8 is a sectional view of a curved part of the coupling rod according to FIG. 1.

The bore 19 in the sleeve 20 shown in FIGS. 5 and 6 also has in each instance one location of minimum diameter from which it widens out in an arcuate cross-section towards the convex end face 21. The radius $\alpha$ of this arc corresponds to the bending radius R.

Whereas in the sleeves 3, 4, 15 shown in FIGS. 1 to 4, each end face merges directly into the periphery faces which serve as support faces 22, 23 and 24 for the rings, in the embodiment shown in FIGS. 5 and 6 the support face 25 for each of the rings 26 on the sleeves 20 is located on a flange-shaped part 27, in one end face 28 of which there is a cup-shaped recess 29 and in the other end face 30 of which there is a partially spherical projection 31. In this embodiment, the transmission of the transverse forces is even more favourable than in the case of the first-described embodiments, because the force component is even smaller in the longitudinal direction of the coupling rod. The depth of the cup-shaped recess 29 is somewhat smaller than the height of the spherical projection 31 so that between the flange-shaped part 27 of adjacent sleeves 20 a small distance $b$ always remains. This distance $b$ is necessary so that the coupling rod can be bent into the position shown in FIG. 6, whereby the binding is limited by the flanges as shown.

Figure 9:
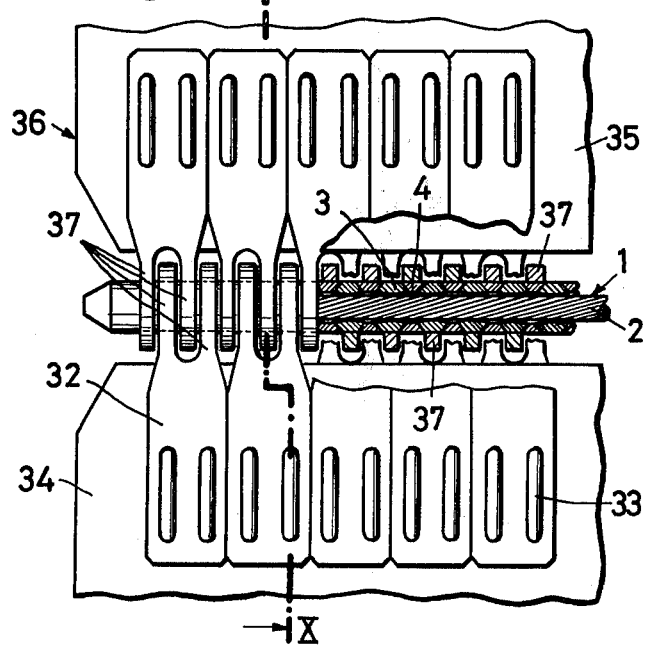
FIG. 9 shows a plan view partly in section of conveyor belt connecting elements having rings, and with a coupling rod inserted
Figure 10:
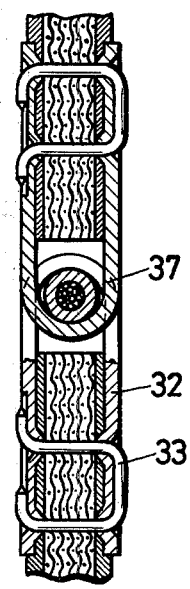
FIG. 10 is a sectional view taken on the line X—X in FIG. 9.

FIGS. 9 and 10 show conveyor belt connecting elements 32 which are connected in known manner and by means of bent-over hooks 33, to the ends 34, 35 of a conveyor belt 36. The core 2 and the pushed-on sleeves 3 and 4 of the coupling rod 1 engage through the rings 37 of the conveyor belt connecting elements so that a reliable and flexible connection of the ends 34, 35 of the conveyor belt 36 is accomplished.

The length of the preferably cylindrical or, in the case of the rings 37 with a round cross-section convexly curved supporting faces 22, 23, 24 and 25 corresponds to the width of the rings 10, 11, 12, 26 and 37. The support surfaces 22, 23 and 24 lie symmetrically with respect to the two concave or concave/convex end faces of the sleeves 3, 4 and 15, while in the case of the sleeve 20 they are asymmetrical with respect to the cup-shaped recess 29 and the spherical projection 31. The position of the central points of the spherical curvatures on the end faces is selected as a function of the desired flexibility of the coupling rod 1.

The overall length of two adjacent sleeves 3, 4 or 15 or 20 corresponds to the pitch length of the rings on one side of the connector.

Thus, each sleeve bears against only one ring on the conveyor belt connecting elements.

Since sleeves, which are preferably made of steel, rest against each other on a smaller diameter than the supporting surface of the rings on the periphery of the sleeves, there is within the sleeves a smaller friction moment than in the zone in which the rings rest on the sleeves, so that, as the joint revolves around a drum, the sleeves rotate in each other and wear on the rings is avoided.

The sleeves are produced by non-cutting shaping and they are furthermore case-hardened or nitrided, in order to achieve the longest possible working life.

Although the invention has been described with reference to specific example embodiments, it is intended to cover all modifications and equivalents within the scope of the appended claims.

What is claimed is:

1. A coupling mechanism for connecting the ends of a conveyor belt to each other along a given axis, comprising belt connecting elements (32) having intermeshing loops (37) at their free ends, means (33) securing said belt connecting elements to said conveyor belt ends in such positions that said loops form a continuous passageway, pin means withdrawably extending through said passageway, said pin means comprising a given radius of curvature (R), flexible core means, sleeve means enveloping said flexible core means, said sleeve means comprising a plurality of elements each of which has a concave end surface and a convex end surface so that adjacent sleeve elements fit into each other, each sleeve element further comprising a bore with a diameter which increases from said concave end surface to said convex end surface, each bore having an arcuate cross-section in the direction of said given axis, said arcuate cross-section opening toward the convex end surface and having a radius of curvature corresponding substantially to said given radius of curvature whereby edge contacts between said flexible core means and said sleeve means are substantially avoided in said pin means.

2. The coupling mechanism according to claim 1, wherein each sleeve element further comprises flange means surrounding the sleeve element proper at its end surface, said flange means being spaced from each other when the pin means are straight and touching each other so as to limit said given radius of curvature when the pin means are bent.

3. The coupling mechanism according to claim 1, wherein the overall length of two adjacent sleeve elements corresponds to the pitch of said loops along one belt end.

4. The coupling mechanism according to claim 1, wherein the sleeve elements have outer support surfaces corresponding in length to the widths of said loops.

5. The coupling mechanism according to claim 1, wherein the sleeves have outer support surfaces each of which extends symmetrically with respect to its end faces.

6. A coupling mechanism for connecting the ends of a conveyor belt to each other along a given axis, comprising belt connecting elements (32) having intermeshing loops (37) at their free ends, means (33) securing said belt connecting elements to said conveyor belt ends in such positions that said loops form a continuous passageway, pin means withdrawably extending through said passageway, said pin means comprising a given radius of curvature (R), flexible core means having a given diameter, sleeve means enveloping said flexible core means, said sleeve means comprising a first set of sleeve elements each of which has a concave end surface at each end and a second set of sleeve elements each of which has a convex end surface at each end, said sleeve elements alternating along the core means so that adjacent sleeve elements fit into each other whereby a sleeve element with concave end surfaces rests on the convex end surfaces of the adjacent sleeve elements with such convex end surfaces, each sleeve element of the first set further comprising a bore with a diameter which is larger than said given diameter of the core means, each sleeve element of the second set further having a bore with an arcuate cross-section in the direction of said given axis, said arcuate cross-section flaring outwardly from a central plane toward both convex end surfaces and having an inner diameter corresponding substantially to said given core diameter at said central plane and increasing axially outwardly toward both convex ends whereby edge contacts between said flexible core means and said sleeve means are substantially avoided.

7. The coupling mechanism according to claim 6, wherein the overall length of two adjacent sleeve elements corresponds to the pitch of said loops along one belt end.

8. The coupling mechanism according to claim 6, wherein the sleeve elements have outer support surfaces corresponding in length to the widths of said loops.

9. The coupling mechanism according to claim 6, wherein the sleeves have outer support surfaces each of which extends symmetrically with respect to its end faces.

* * * * *